(12) United States Patent
Kobayashi et al.

(10) Patent No.: US 7,053,507 B2
(45) Date of Patent: May 30, 2006

(54) LINEAR OSCILLATING ACTUATOR SYSTEM

(75) Inventors: Noboru Kobayashi, Hikone (JP);
Masashi Moriguchi, Inukami-gun (JP);
Takahiro Nishinaka, Omihachiman (JP); Hidekazu Yabuuchi, Hikone (JP);
Ryo Motohashi, Hikone (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 11/013,331

(22) Filed: Dec. 17, 2004

(65) Prior Publication Data

US 2005/0134123 A1 Jun. 23, 2005

(30) Foreign Application Priority Data

Dec. 22, 2003 (JP) .............................. 2003-425860

(51) Int. Cl.
*H02K 33/00* (2006.01)
(52) U.S. Cl. .......................................... 310/36; 310/15
(58) Field of Classification Search ............ 310/12–15, 310/36–39; 30/43.92, 43.93
See application file for complete search history.

(56) References Cited

U.S. PATENT DOCUMENTS 5,921,134 A * 7/1999 Shiba et al. ................... 74/110
6,559,563 B1 * 5/2003 Shimizu et al. ............... 310/12

FOREIGN PATENT DOCUMENTS

JP          53-42235 B    10/1978

* cited by examiner

*Primary Examiner*—Thanh Lam
(74) *Attorney, Agent, or Firm*—Rader, Fishman & Grauer

(57) ABSTRACT

A linear oscillating actuator system which is capable of canceling out the stator vibrations for driving a load with a minimum of vibrations. The system includes an oscillator carrying a permanent magnet as well as an output shaft for connection to the load. A stator assembly is incorporated within a housing and is configured to movably support the oscillator and to carry an electromagnet. The electromagnet generates a magnetic field which interacts with the permanent magnet to reciprocate the oscillator relative to the stator assembly in a linear path. A balancer is added to the system for canceling out undesired stator vibrations. The balancer are commonly supported to the stator assembly to be driven thereby in parallel with the oscillator. The balancer is configured to have a mass generally equal to that of the oscillator and to be devoid of any output member. Thus, the oscillator and the balancer are driven in a counter reciprocating manner, thereby keeping the stator assembly free from counter-vibrations and therefore driving the output shaft with a maximum output power.

7 Claims, 5 Drawing Sheets

LINEAR OSCILLATING ACTUATOR SYSTEM

TECHNICAL FIELD

The present invention is directed to a linear oscillating actuator system provided with a balancer for driving a load with reduced stator vibrations.

BACKGROUND ART

Japanese Utility Model Publication JP53-42235 discloses an oscillating actuator system having a single output for imparting a reciprocating motion to a load, i.e., the inner cutter of a dry shaver. The actuator includes a stator assembly including an electromagnet and an oscillator held in a closely spaced relation with the stator assembly. The oscillator includes a permanent magnet that is magnetically coupled to the electromagnet for driving the oscillator in response to an alternating current supplied to the electromagnet. While driving the oscillator, the stator assembly is subject to counter vibrations, causing unpleasant stator vibrations felt by a user and eventually lessening the output power of the actuator.

DISCLOSURE OF THE INVENTION

In view of the above problem, the present invention has been accomplished to provide a linear oscillating actuator system which is capable of canceling out the stator vibrations for driving the load with a minimum of vibrations being felt by the user and with a maximum power. The linear oscillating actuator system in accordance with the present invention includes an oscillator carrying a permanent magnet as well as an output shaft which is adapted to be connected for driving the load. A stator assembly is incorporated within a housing and is configured to movably support the oscillator and to carry an electromagnet. The electromagnet generates a magnetic field which interacts with the permanent magnet to reciprocate the oscillator relative to the stator assembly in a linear path. The system is characterized to include a balancer which is supported to the stator assembly. The balancer includes a permanent magnet which interacts with the magnetic fields for reciprocating the balancer along the linear path in an opposite phase relation with the oscillator. The balancer is configured to have a mass generally equal to that of the oscillator and to be devoid of any output member used for driving an external member. Thus, the oscillator and the balancer are driven in a counter reciprocating manner, thereby keeping the stator assembly free from counter-vibrations and therefore driving the output shaft with a maximum output power.

Preferably, the output shaft is designed to project from the oscillator at a center of its thickness extending perpendicular to the linear path. Thus, a rotation moment about the output shaft is minimized to thereby minimize a torsion being applied to any mounting member responsible for movably supporting the oscillator to the stator assembly.

Also, the said oscillator and said balancer are preferably configured to have their respective mass centers aligned around the output shaft for the purpose of minimizing vibrations in the thickness direction.

The oscillator may be shaped from a plastic mold into which a magnetic yoke is entrapped in contact with the permanent magnet. In this case, the output shaft is secured to the magnetic yoke and is reinforced thereby to be given increased rigidity sufficient for minimizing the distortion of the output shaft.

Further, the oscillator and the balancer may be are interconnected by a mechanical link for assisting the reverse phase reciprocating relation therebetween. The mechanical link is connected to the oscillator at a point spaced upwardly of the permanent magnet along a length of the output shaft, reducing a possibility of bending the output shaft in its length with an attendant increase of energy transmission efficiency to the load.

In a preferred version, the stator assembly includes mounting members for supporting the oscillator and the balancer, and the oscillator and the are interconnected by way of coupler springs. The mounting member and the coupler spring are secured to the oscillator at the same spots, and also secured to the balancer at the same spots. Thus, the oscillator and the balancer can be fabricated together with the stator assembly with a minimum number of fastening steps or parts.

The actuator system can be used as a driving source of a hair cutter to have the output shaft connected to a movable cutter for reciprocation thereof relative to a stationary cutter.

These and still other advantageous features of the present invention will become more apparent from the following description of the preferred embodiments when taken in conjunction with the attached drawings.

BEST MODE FOR CARRYING OUT THE INVENTION

Figure 1:
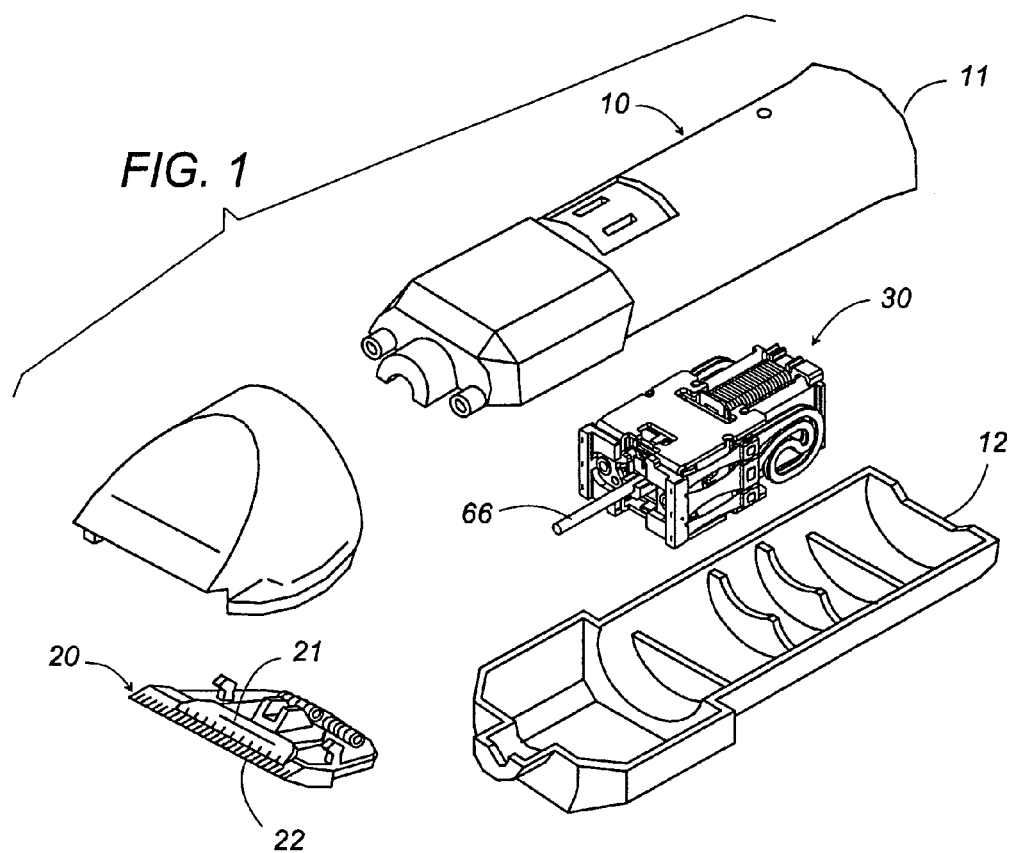
FIG. 1 is an exploded perspective view of a hair cutter utilizing a linear oscillating actuator system in accordance with a preferred embodiment of the present invention.
Figure 2:
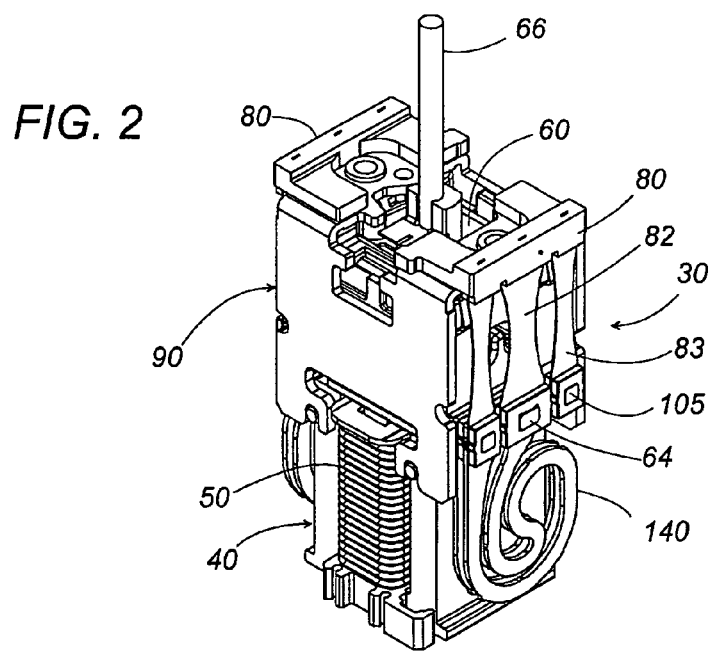
FIG. 2 is a perspective view of an actuator of the above system.
Figure 3:
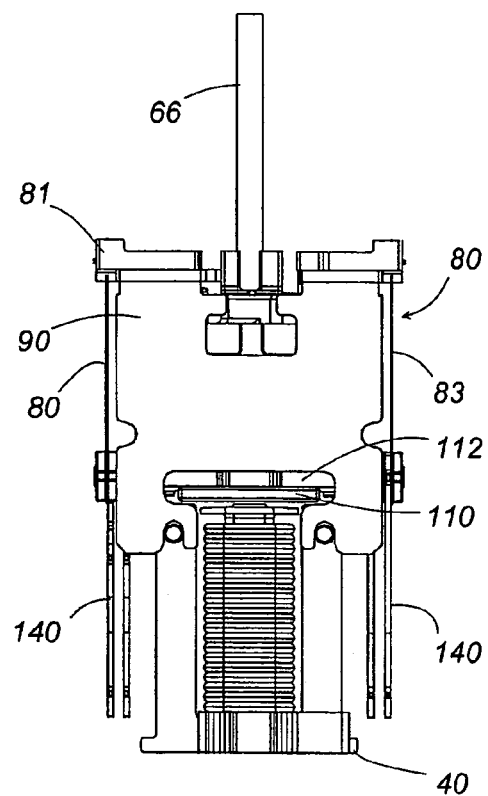
FIG. 3 is a front view of the actuator.
Figure 4:
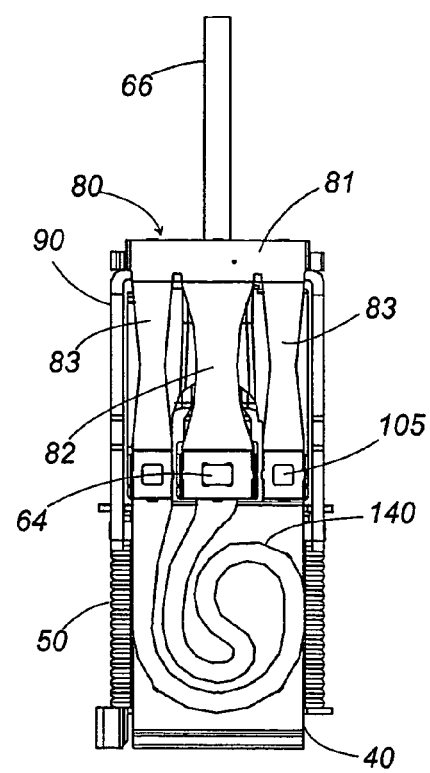
FIG. 4 is a side view of the actuator.
Figure 5:
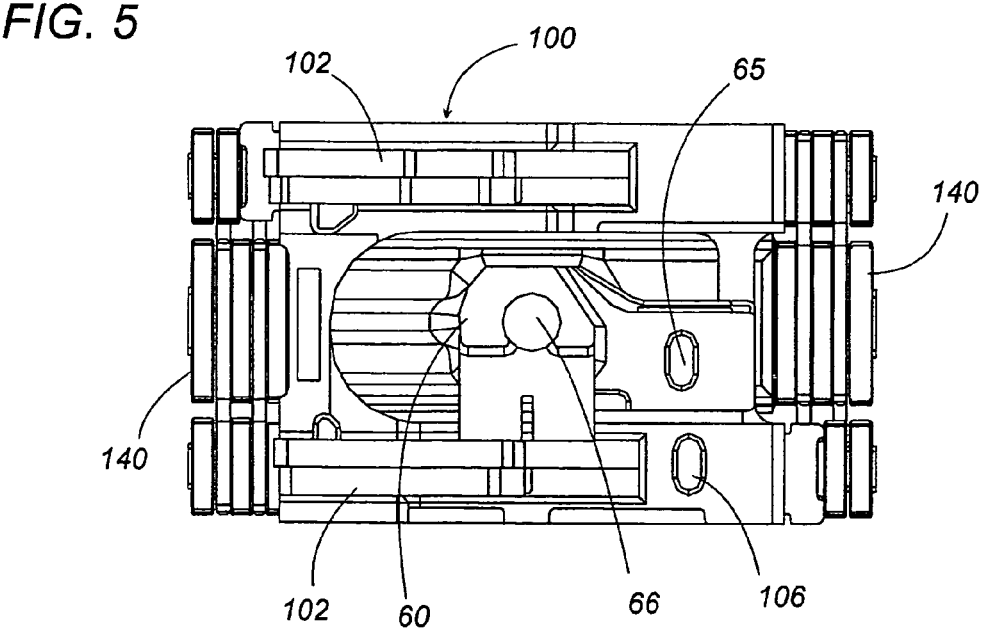
FIG. 5 is a top view of the actuator shown with a portion thereof removed.

Now referring to FIG. 1, there is shown a hair cutter as one typical example which utilizes a linear oscillating actuator system of the present invention. The hair cutter includes a housing 10 composed of halves 11 and 12 to accommodate an actuator 30, and a cutter block 20 composed of a movable cutter 21 and a stationary cutter 22 fixed to the housing 10. The actuator 30 has an output shaft 66 which is connected to the movable cutter 21 for reciprocating it relative to the stationary cutter 22 for cutting hairs therebetween.

As best shown in FIGS. 2 to 6, the actuator 30 is basically composed of a stator assembly 40 carrying an electromagnet 50, and an oscillator 60 carrying a permanent magnet 70 as well as the output shaft 66. The electromagnet 50 includes an E-shaped stator 51 having a center core 52 and a pair of side cores 53. A coil 54 is wound around the center core 52 to magnetize pole ends at the respective upper ends of the center and side cores to opposite polarity upon being energized by a current. The stator assembly 40 includes a generally U-shaped frame 90 secured to and project on the upper end of the electromagnet 50 for suspending the oscillator 60 as well as a balancer 100 in a closely adjacent relation to the upper end of the electromagnet 50 by means of hangers 80. Each of hangers 80 include a header 81 fixed to the upper end of the frame 90 and three spring links 82 and 83 depending commonly from the header 81 for connection at their lower ends respectively with the oscillator 60 and the balancer 100.

Figure 7:
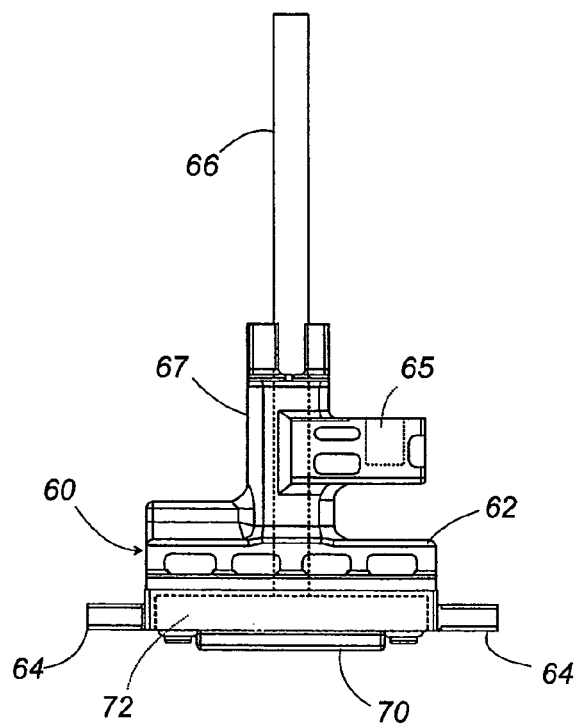
FIG. 7 is a front view of an oscillator employed in the actuator system.
Figure 8:
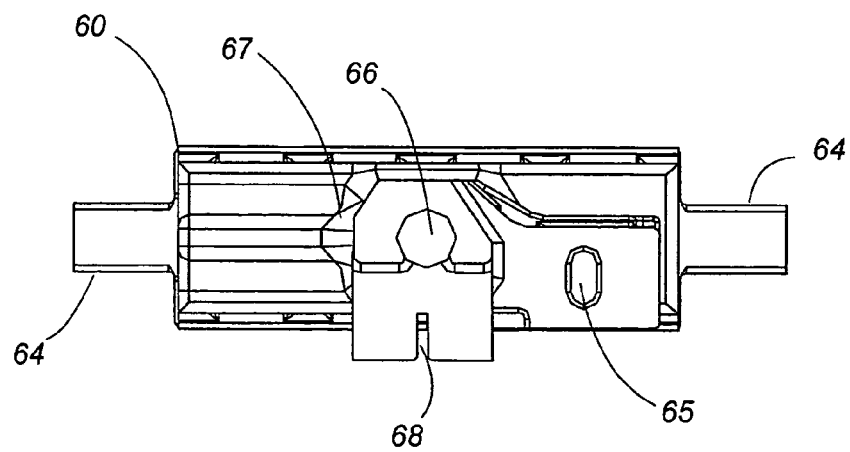
FIG. 8 is a top view of the oscillator.

The oscillator 60 is molded from a plastic material into a horizontally elongated base 62 with studs 64 on its opposite ends for welded connection into holes 84 at the lower ends of the associated spring links 82. The permanent magnet 70 is exposed on the bottom of the base 62 and is backed-up by a magnetic yoke 72 secured to the lower end of the base 61. The output shaft 66 projects upwardly from a center of the base 62 with respect to the length and width thereof. The output shaft 66 is made of a metal and extends through the base 62 with its lower end anchored to the magnetic yoke 72, as best shown in FIG. 7. Likewise, the balancer 100 is molded from a plastic material and shaped into a generally U-shaped configuration with parallel crosspieces 102 between which the oscillator 60 is positioned. Each of the crosspieces 102 is formed at its opposite ends with studs 105 for welded connection respectively into holes 85 at the lower ends of the associated spring links 83. A permanent magnet 110 is exposed on the bottom of each crosspiece 102 and is backed-up by a magnetic yoke 112 secured to the lower end of each crosspiece 102.

Upon being supplied with an alternating current, the electromagnet 50 generates an alternating magnetic field which interacts with the permanent magnets 70 and 110 for reciprocating the oscillator 60 as well as the balancer 100 respectively in linear paths. The permanent magnets 70 and 110, each in the form of a horizontally extending flat bar, are magnetized to opposite directions so that the oscillator 60 and the balancer 100 are driven in a counter reciprocating manner, i.e., in a reveres phase relation with each other.

The balancer 100 is configured to have a mass which is generally equal to that of the oscillator 60 inclusive of the output shaft 66, and to be devoid of any output member driving an external member, thereby canceling out the stator vibrations which would otherwise develop on the side of the stator assembly 40 to lower the output efficiency as well as be felt by the user grasping the housing 10. In this connection, since the output shaft 66 projects from the center of the oscillator 60 particularly with respect to the horizontal thickness thereof, the oscillator 60 can be free from receiving a rotation movement about the output shaft 66 while driving the load, thereby minimizing a torsion being applied to the spring links 82 or the mounting member for supporting the oscillator 60 to the stator assembly 40. Also, the balancer 100 is configured to align its mass center with that of the oscillator 60 around the output shaft 66 in order to keep the oscillator 60 free from undesired lateral vibrations. The base 62 of the oscillator 60 is formed with a collar 67 which surrounds the lower end of the output shaft 66 and is shaped to receive a weight for adjusting the mass of the oscillator 60 in match with the balancer 100. Further, the base 62 is also formed with a slit 68 for mounting a marker (not shown) by which the position of the oscillator 60 is monitored for feedback control of its movement.

Figure 6:
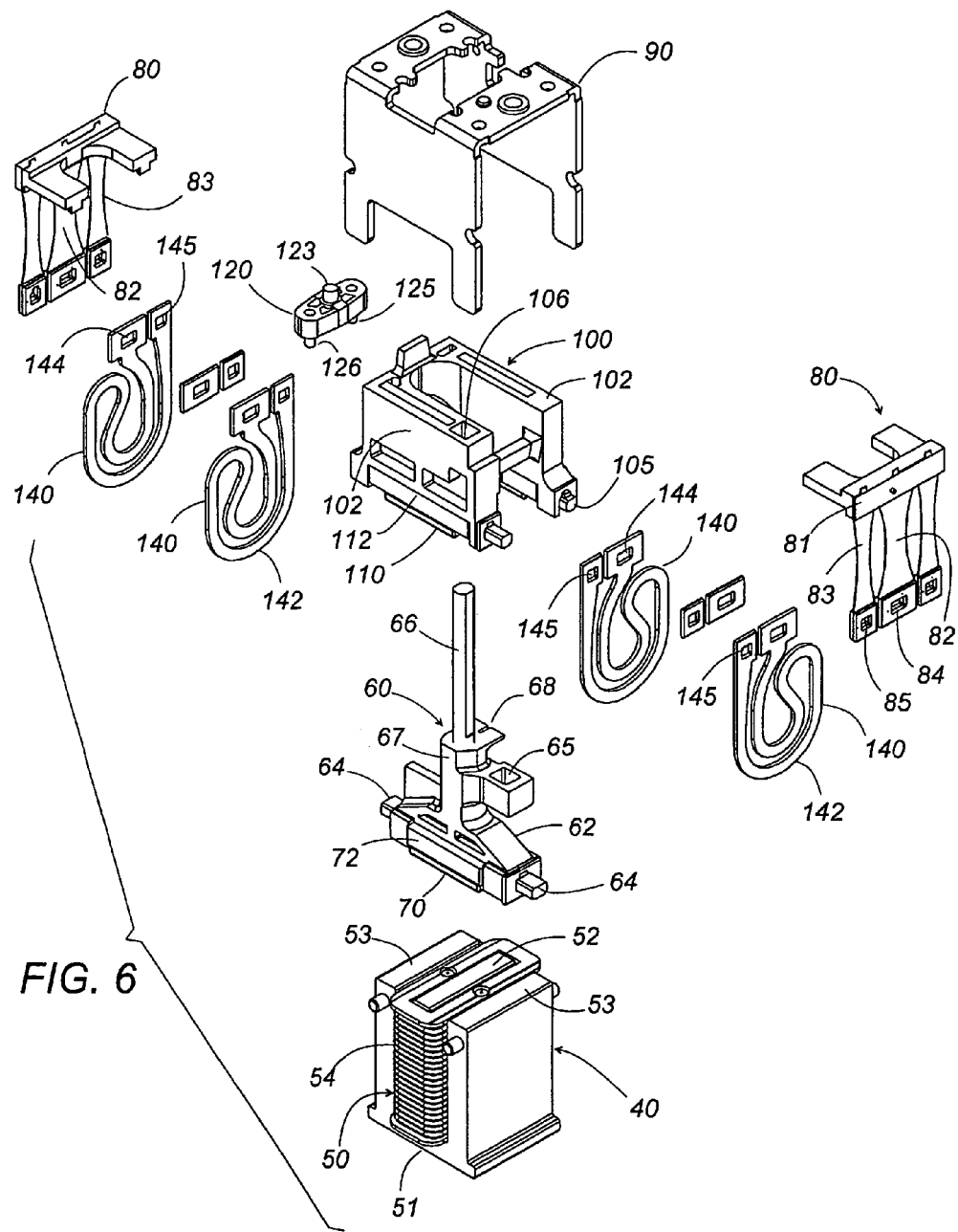
FIG. 6 is an exploded perspective view of the actuator system shown with a portion removed.
Figure 9:
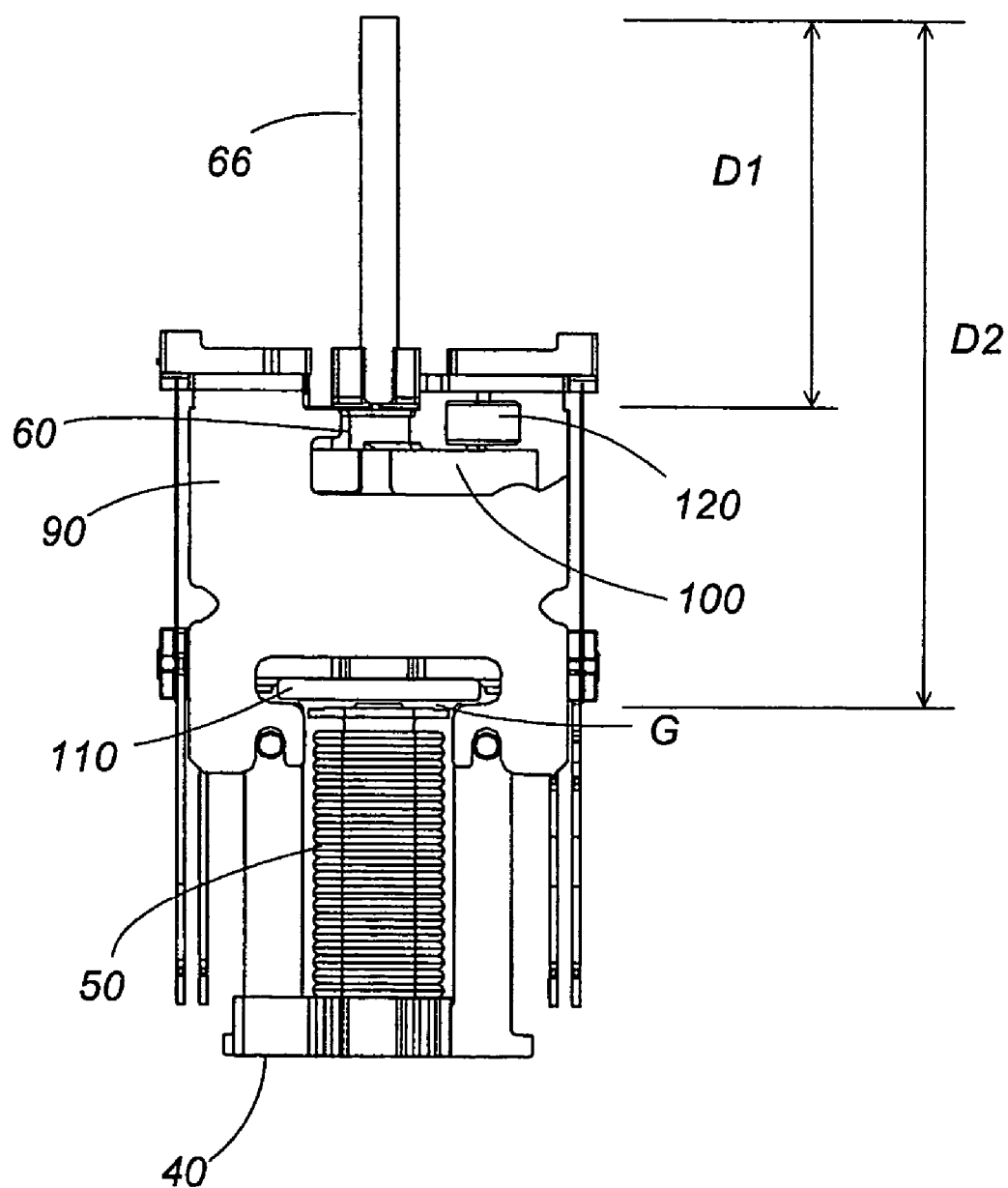
FIG. 9 is a front view of the actuator shown with a portion thereof cut away.

In order to assist the reverse phase relation between the oscillator 60 and the balancer 100, they are interconnected by a mechanical link 120 at a level upwardly of the permanent magnet 70 along the height of the output shaft 66, as shown in FIGS. 6 and 9. The mechanical link 120 is formed in its top with an axle 121 rotatably supported to the upper end of the frame 90, and is also formed on its bottom with two pins 125 and 126 one of which fits into a bore 65 in the upper end of the base 62 at a portion offset from the output shaft 66 and the other of which fits into a bore 106 in the upper end of the crosspiece 102.

As shown in FIG. 9, the mechanical link 120 interconnects the oscillator 60 to the balancer 100 sufficiently upwardly of the gap G between the permanent magnets and the electromagnet 50 where the oscillator 60 receives a thrust from the electromagnet. Thus, the distance D1 between the top end of the output shaft 66 is made considerably shorter than distance D2 between the top end of the output shaft 66 to the gap, which gives sufficient resistance against the bending of the output shaft 66 when driving to reciprocate the load connected to the top end of the output shaft.

Further, the oscillator 60 and the balancer 100 are interconnected by a plurality of coupler springs 140 also for assisting the reverse phase relation. The coupler springs 140 are configured to resiliently deform, in response to the balancer 100 moving in one direction, so as to add a resulting bias to the oscillator 60 moving in the opposite direction for driving the load at an optimum output efficiency. The two coupler springs 140 are positioned on each longitudinal end of the oscillator 60 for interconnecting the oscillator 60 to the one crosspiece 102 of the balancer 100. The interconnection is made simultaneously at the connection of the spring links 82 and 83 to the oscillator 60 and the balancer 100. For this purpose, each coupler spring 140 is formed at its upper end with mount holes 144 and 145 receiving the studs 64 and 105 of the oscillator 60 and the balancer 100. Each coupler spring 140 includes a spring leg 142 which is bent in a vertical plane and is disposed in an overlapping relation to each opposite side of the stator assembly 40.

The invention claimed is:

1. A linear oscillating actuator system comprising:
   a housing;
   an oscillator configured to include an oscillator permanent magnet as well as an output shaft which is adapted to be connected to drive a load; and,
   a stator assembly incorporated in said housing, said stator assembly being configured to movably support said oscillator and to carry an electromagnet, said electromagnet generating a magnetic field which interacts with said oscillator permanent magnet to reciprocate said oscillator relative to said stator assembly in a linear path,
   wherein
   a balancer is supported to said stator assembly, said balancer being configured to include a balancer permanent magnet which interacts with said magnetic fields for reciprocating said balancer along said linear path in an opposite phase relation with said oscillator,
   said balancer being configured to have a mass generally equal to that of said oscillator and being configured to have no output shaft or connection with the load.

2. The linear oscillating actuator system as set forth in claim 1, wherein
   said oscillator has a thickness perpendicular to said linear path, and said output shaft projects from a center of the thickness of said oscillator.

3. The linear oscillating actuator system as set forth in claim 1, wherein
   said oscillator and said balancer have their respective mass centers aligned around said output shaft.

4. The linear oscillating actuator system as set forth in claim 1, wherein said oscillator is shaped from a plastic mold into which a magnetic yoke is entrapped in contact with said oscillator permanent magnet, said output shaft being secured to said magnetic yoke.

5. The linear oscillating actuator system as set forth in claim 1, wherein
said oscillator and said balancer are interconnected by a mechanical link for assisting said reverse phase relation therebetween,
said mechanical link being connected to said oscillator at a point spaced upwardly of said oscillator permanent magnet along a length of said output shaft.

6. The linear oscillating actuator system as set forth in claim 1, wherein
said stator assembly includes mounting members for supporting said oscillator and said balancer,
said oscillator and said balancer are interconnected by way of coupler springs,
said mounting member and said coupler spring are secured to said oscillator at the same spots, and
said mounting member and said coupler springs are secured to said balancer at the same spots.

7. A hair cutter incorporating the linear oscillating actuator system as set forth in claim 1, wherein
said hair cutter includes a movable cutter movable relative to a stationary cutter,
said movable cutter being connected to said output shaft to be driven thereby to reciprocate for cutting hair.

* * * * *